United States Patent [19]

Pinto

[11] Patent Number: 4,647,468
[45] Date of Patent: Mar. 3, 1987

[54] APPARATUS FOR FORMING FILLED EDIBLE PRODUCTS WITHOUT WASTE

[75] Inventor: Albert A. Pinto, White Plains, N.Y.

[73] Assignee: Nabisco Brands, Inc., Parsippany, N.J.

[21] Appl. No.: 611,745

[22] Filed: May 18, 1984

[51] Int. Cl.$^4$ .......................... A21C 3/04; A21D 8/02
[52] U.S. Cl. .................................. 426/503; 425/296;
425/307; 425/308; 425/315; 426/516; 426/517
[58] Field of Search .................. 99/450.1, 450.6;
425/296, 298, 310, 307, 308, 315, 133.1, 131.1,
306; 426/284, 503, 512, 514, 518, 516, 517

[56] References Cited

U.S. PATENT DOCUMENTS

| | | | |
|---|---|---|---|
| 2,181,737 | 11/1939 | North | 17/32 |
| 2,318,718 | 5/1983 | Scherer | 425/5 |
| 2,490,781 | 12/1949 | Cloud | 425/307 |
| 2,501,833 | 3/1950 | Webb et al. | 425/296 |
| 2,513,581 | 7/1950 | Moule | 425/5 |
| 2,597,986 | 5/1952 | Halstead | 264/4 |
| 2,717,419 | 9/1955 | Dickey | 425/237 |
| 3,320,718 | 5/1967 | Thesing | 425/315 |
| 4,028,024 | 6/1977 | Moreland | 425/296 |
| 4,411,611 | 10/1983 | Ohtawa et al. | 425/308 |
| 4,469,475 | 9/1984 | Krysiak | 425/133.1 |

Primary Examiner—Willard E. Hoag
Attorney, Agent, or Firm—Richard Kornutik

[57] ABSTRACT

Round dough pieces having an inner portion enveloped by a dissimilar outer portion are formed without generating waste by continuously extruding two dissimilar materials to form an extrudate rope having a core of one material and an outer tube of the other material, depositing the extrudate rope on a continuously moving conveyor, pinching the extrudate rope at predetermined intervals to form spaced sections of reduced width, and separating the extrudate rope into individual dough pieces at said reduced width sections.

9 Claims, 4 Drawing Figures

APPARATUS FOR FORMING FILLED EDIBLE PRODUCTS WITHOUT WASTE

BACKGROUND OF THE INVENTION

The present invention relates to the manufacture of edible products having dissimilar inner and outer portions, and, more particularly to the manufacture of such products in which the inner portion is enveloped by the outer portion.

The types of products to which the present invention relates include baked goods that are baked from dough pieces having an outer layer of farinacious dough and a core which may be a dissimilar dough or another material such as a jam, cream, puree, paste, or other extrudable form of fruit, cheese, meat, vegetable, confection or other edible substance. In those products where the core is also a dough, the inner and outer doughs would be dissimilar in composition so as to produce different tastes, colors, appearances, textures, consistencies, or the like in the inner and outer portions of the baked product.

In the past, products of this type have been formed from laminated sheets in which two dough layers are separated by a layer of filling material. This approach is used in the method disclosed in U.S. Pat. No. 3,494,302 wherein the laminated sheet is divided transversely and longitudinally into rectangular dough pieces. The product produced by the method and apparatus of that patent is danish pastry. If such an approach were used to produce products using doughs which spread during the baking process, like soft cookie doughs, the individual rectangular pieces would have to be separated in both the longitudinal and transverse directions to prevent the dough pieces from fusing together during baking. It would, of course, require extra labor or machinery to effect such separations.

The laminated sheet approach is not suitable for producing products having the round configuration associated with most conventional cookies. To achieve a round baked product, the dough piece must be round or substantially round, depending on the extent to which the dough spreads during baking. To cut round dough pieces from a dough sheet produces a high proportion of scrap. In the production of round unfilled cookies and crackers the scrap is mixed back into the dough so there is no waste. This cannot be done, however, when the dough sheet is a laminate of different materials. The scrap from such a laminate contains some of each material, and to mix it into either of the materials in quantity would change the character of that material and blur the distinction between the outer and inner portions of the baked product.

Another approach to forming products having different inner and outer portions, is disclosed in U.S. Pat. No. 3,572,259. In this approach, the two materials are concentrically extruded and the extrudate rope is divided and formed into concentric dough balls by a pair of rotating wheels having spirally configured peripheries. The apparatus shown, while effective for use in small bakeries, has a limited production capacity and requires a relatively large floor area for its capacity.

The typical band oven used in large commercial bakeries carries up to 18 rows of two inch diameter cookies. The machine of the '259 patent under discussion is capable of producing only a single row of dough pieces. Therefore, 18 of these machines would be required to fill a modern high production oven. Also, it would be necessary to provide a system of conveyors to carry the dough pieces from the machines and deposit them in a regular pattern on the band of the oven.

In my patent application Ser. No. 507,401, filed June 24, 1983 and assigned to the assignee of the present application, an improved method and apparatus is disclosed for forming filled baked goods with low waste, and in quantities sufficient to supply a modern band oven. In the method and apparatus disclosed in this copending application, two dissimilar materials are continuously co-extruded to provide a series of parallel extrudate ropes each composed of an inner core and an outer tube of different materials. The extrudate ropes are deposited on a continuously moving horizontal conveyor and are divided into dough pieces by a reciprocating cutter. The cutter employs blunt knives that displace the inner core material away from the zone beneath the knives, seal the outer tube to itself along that zone, and sever the outer tube within that zone.

The method and apparatus disclosed in the above mentioned application generates between 2% and 4% scrap. While the scrap can be recycled, it is frequently preferable that it be eliminated entirely.

SUMMARY OF THE INVENTION

Accordingly, it is an object of this invention to provide an improved method and apparatus for forming rounded dough pieces from an extrudate rope without generating a significant amount of scrap.

Another object is to provide an improved method and apparatus for forming enrobed dough pieces from an extrudate rope having an inner core and an outer tube of different materials without generating significant scrap.

The foregoing objects are accomplished by extruding an extrudate rope of an edible material, depositing the rope on a horizontal conveyor, pinching the rope at predetermined intervals to form spaced portions of reduced width, and cutting the extrudate at the reduced width portions.

BRIEF DESCRIPTION OF THE DRAWINGS

Preferred embodiments of the invention have been chosen for purposes of illustration and description and are shown in the, accompanying drawings, forming a part of the specification, wherein.

DESCRIPTION OF THE PREFERRED EMBODIMENT

Figure 1:
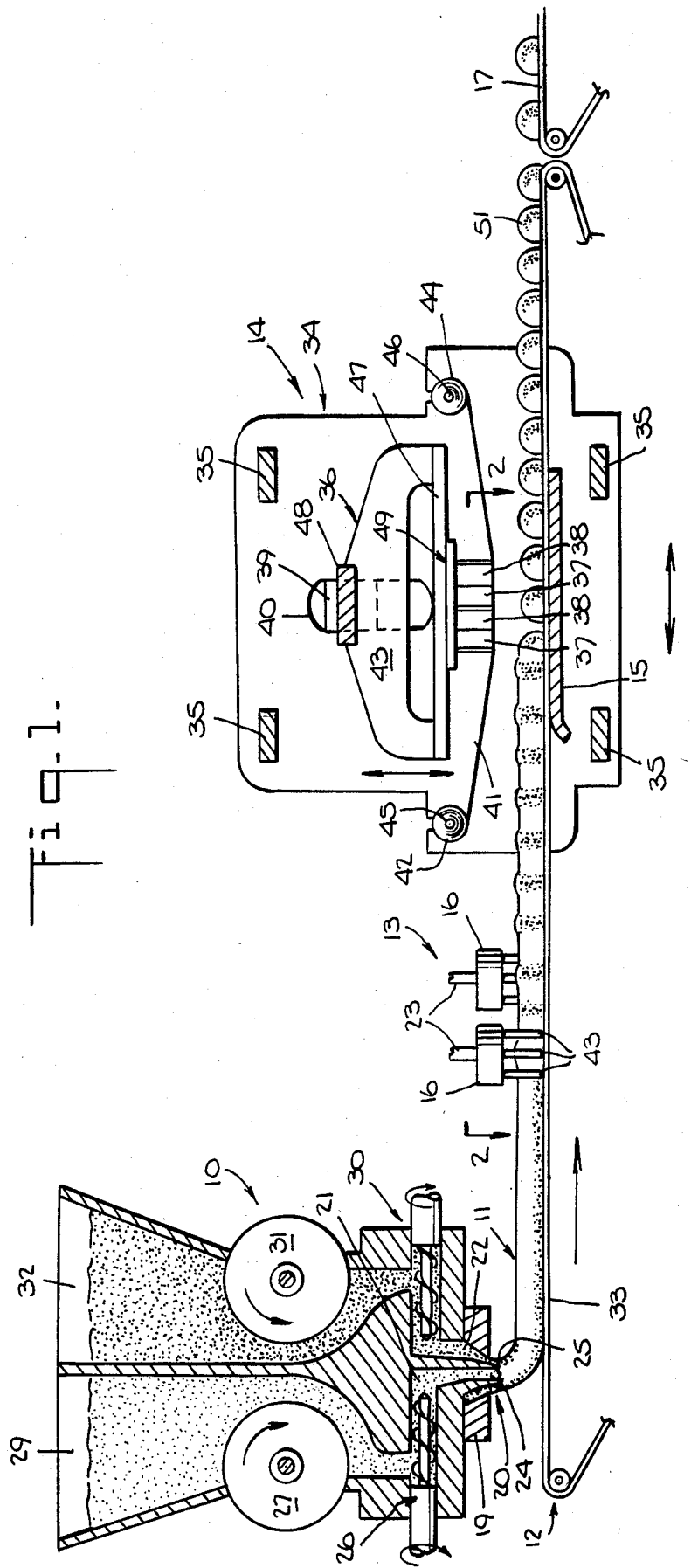
FIG. 1 is a side elevational view, partly in section, schematically illustrating apparatus in accordance with the present invention.

Referring to the drawings, there is shown apparatus according to the present invention which generally includes an extruder 10 producing an extrudate rope 11 of two dissimilar materials arranged concentrically, a conveyor 12 carrying the extrudate rope 11 away from the extruder 10, a mechanism 13 for pinching the rope 11 at predetermined intervals, a reciprocating cutter mechanism 14 positioned above the conveyor, a backing plate 15 positioned beneath the conveyor at the cutting location, and a second conveyor 17 extending from the conveyor 12 toward a baking oven (not shown) and moving faster than the conveyor 12.

The conveyor 12 may be of any width, and normally is equal in width to that of the band of the oven which it feeds. A typical oven band width is 42 inches. In apparatus according to the present invention, a conveyor of that width could accommodate 18 parallel extrudate ropes spaced across the width thereof.

The extruder 10 extends across the entire width of the conveyor and includes a die block 19 which provides a plurality of coextrusion dies 20 (for example, 18 in number) of conventional design which are spaced across the conveyor. Each of the dies 20 have an inner port 21 and an outer port 22. A filler material is fed to the inner port 21 of each die and is extruded as the core portion 24 of the extrudate ropes 11. A dough is fed to the outer port 22 of each die and is extruded as the outer tube portion 25 of the ropes 11.

The inner ports 21 of the dies 20 are fed by individual screw extruder 26. All of the exturders 26 are fed by a single serrated feed roll 27 from a hopper 29. The outer ports 22 of the dies are fed by individual screw extruders 30. All of the extruders 30 are fed by a single serrated feed roll 31 from a hopper 32. The feed rolls 27, 31 and the hoppers 29, 32 extend across the width of the conveyor 12.

The screws of the extruders 26 are each driven to provide the same rate of flow of inner material to their respective dies. In like manner the screws of the extruders 30 are each driven to provide the same rate of flow of outer material to each of the dies. Typically the set of extruders 26 and the set of extruders 30 would each be driven by separate motors, each motor driving its respective set of extruders through a gear train. The drive motors would typically be provided with speed controls to vary the rate of flow of the inner and outer materials independently.

The conveyor 12 includes a cotton fabric conveyor belt 33 which extends from the extruders and passes beneath the pinching mechanism 13 and the cutter 14.

Figure 2:
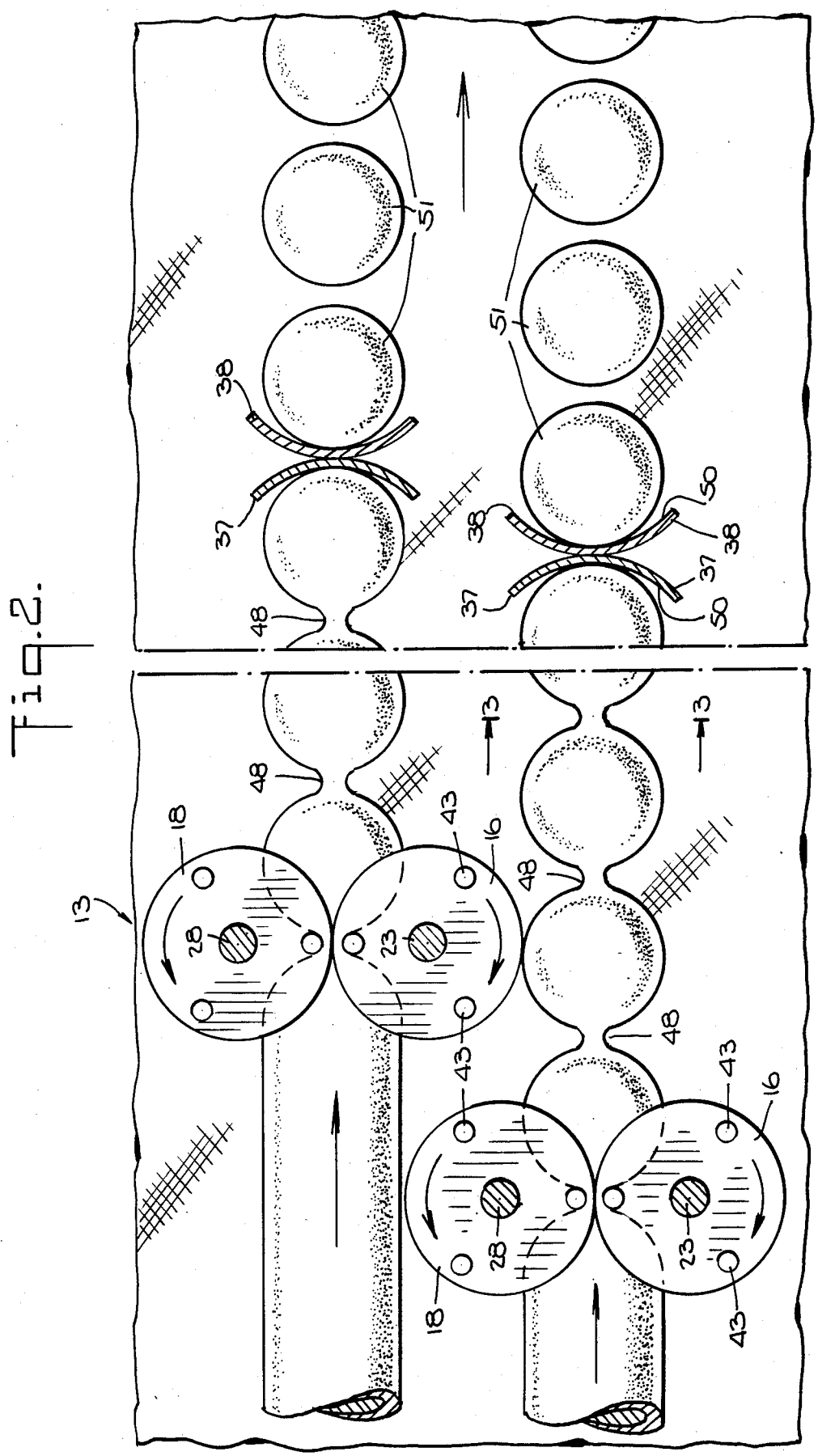
FIG. 2 is a plan view taken along line 2—2 of FIG. 1 with the rubber web removed to shown the extruded rope in various stages along the apparatus.

The pinching mechanism 13 includes a pair of counter-rotating wheels 16, 18 mounted on driven shafts 23, 28 positioned on either side of each rope 11 as more clearly shown in FIG. 2. Each of the wheels are provided with downwardly extending pins 43 for engaging the sides of the ropes 11. As the ropes are moved past the pinching mechanism 13 by the conveyor 12, the wheels 16 rotate clockwise while the wheels 18 rotate counter-clockwise. The wheels are synchronized so that the pins 43 on each pair of wheels 16, 18 simultaneously engage opposite sides of the rope 11 and move inwardly, pinching the rope to form necked down portions 48 having reduced widthsspaced at regular intervals.

The cutter 14 includes a pair of vertical plate members 34 interconnected by transverse bars 35. In FIG. 1, one of the plate members 34 is shown. The cutter 14 is mounted on pivoted legs (not shown) and is reciprocated horizontally parallel to the conveyor belt 33. A die head 36 carrying cutter blades 37 and 38 is mounted between the plates 34 for vertical reciprocating movement. The die head 36 is provided with a slide block 39 that is slidably positioned in a vertical slot 40 formed in each of the plate members 34.

The pinching mechanism 13 and the cutter mechanism 14 are positioned and synchronized so that the cutter blades 37, 38 engage the extrudate rope at the necked down portions 48.

The horizontal and vertical motions of the cutter 14 are synchronized so that the die head 36 is moving horizontally at the velocity of the conveyor belt 33 during the time when the blades 37 and 38 of the die are in engagement with the extrudate ropes 11.

A thin rubber web 41 is positioned between the cutter blades 37, 38 and the extrudate ropes 11. The web extends from a supply roll 42 to a take-up roll 44. The rolls 42 and 44 are respectively wound around rods 45 and 46 that extend between the plates 34. In the preferred embodiment, the web 41 is a latex rubber sheeting of between 6 and 9 thousandths of an inch in thickness.

As the die head 36 moves downwardly, it carries the rubber web toward the extrudate ropes. When the cutter blades 37, 38 are pressed into the extrudate ropes 11, the web stretches and conforms to the contours of the blades. Upon upward movement of the die head, the web contracts to its original flat configuration and insures positive separation of the cut dough pieces from the cutter blades. Since blades 37, 38 have a blunted lower edge, the cutting blades will not immediately cut through the web. When the blades begin to cut through the rubber web after repeated cuts, the rods 31 and 32 are manually or automatically rotated to bring a fresh section of web under the die. In order to keep the cut pieces from adhering to the web, the web is preferably made of a material to which the cut pieces do not readily adhere. Additionally, the flexing elastic action of the web when it conforms to its flat configuration after the blades 37, 38 have cut through the dough ensures that the dough pieces do not adhere to the web.

The die head 36 is mounted between the slide blocks 39 by means of a plurality of arch members 43 joined to a bar 48 which is carried by the blocks 39. A bolster plate 47 is bolted to the arch member 43 and a cutter die 49 carrying the blades 37, 38 is bolted to the bottom of the bolster plate 47.

Figure 3:
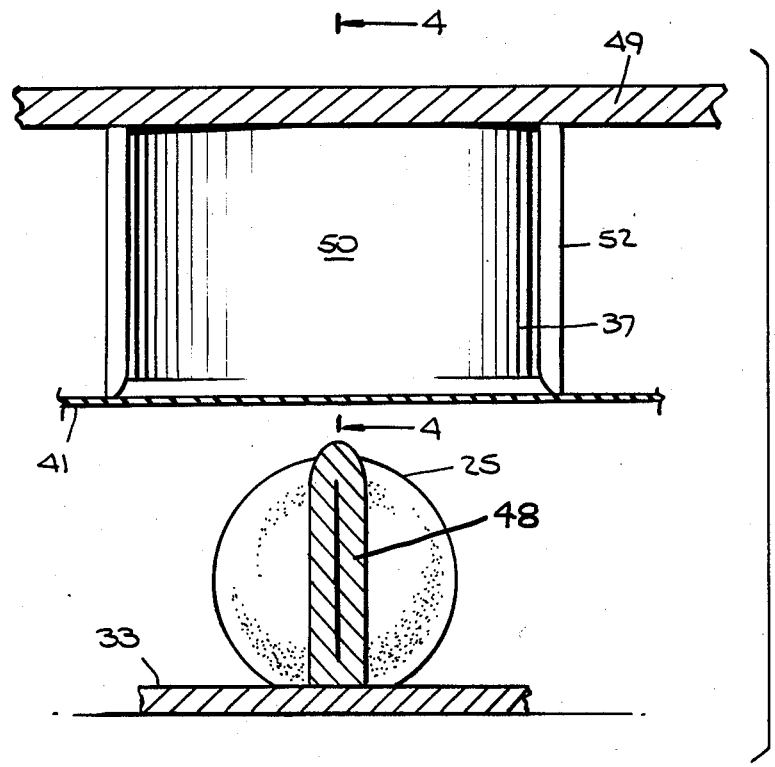
FIG. 3 is a sectional view taken along line 3—3 of FIG. 2 showing the cross section of the extrudate rope.

Referring now more particularly to FIG. 2, the pair of blades 37, 38 are positioned over each extrudate rope 11 as shown. The blades 37, 38 extend transversely with respect to the ropes 11. They are joined back to back at the center line of the rope and curve away from each other. With reference to FIGS. 2 and 3, the blades 37 are curved to provide a concave surface 50 facing in the upstream direction toward the extruders. The blades 38 are curved so that its concave surface 50 faces downstream toward the oven. As shown in FIG. 2, the sets of blades are staggered so that the dough pieces 51, formed by the operation of the cutter blades, are positioned in staggered rows. During the baking process, the dough pieces spread outwardly in all directions and, therefore, they must be separated by a sufficient distance to prevent them from spreading into each other. The dough pieces in each row are separated along the line of the row a sufficient distance as they are transferred to the conveyor 17 which runs at a faster rate. The staggering of the dough pieces in adjacent rows provides the necessary lateral separation while allowing closer row spacing than would otherwise be possible.

Figure 4:
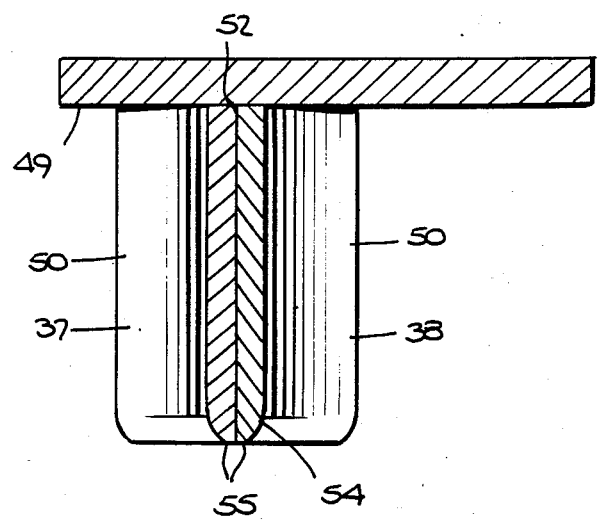
FIG. 4 is a sectional view taken along line 4—4 of FIG. 3 showing a cross section of the knife blades.

In cross section, as shown in FIG. 4, the convex surfaces 52 of the blades extend vertically from top to bottom. The concave surfaces 50 are formed with a tip section 54 that curves inwardly to a narrow flat surface or land 55 on the edge of the blade.

As the blades 37, 38 descend upon the necked down portions 48, the blunt edges of the blades displace the dough under the blades to form separated round dough pieces 51, and substantially no waste is produced.

In a preferred embodiment, the blades are ⅛ inch thick, have a land 55 which is 1/64 inch wide, and the surfaces 50, 52 are curved in concentric circular arcs, the radius of the arc of the surface 52 being ⅞ inch. In this embodiment the central orifice of the die 20 is round having a diameter of 11/16 inch and the outer orifice is 1 inch in diameter and spaced ¼ inch below the inner orifice. The extrudate rope has a diameter of about 15/16 inch as a result of a slight stretching action, and the spacing of the cut lines along the center line of the ropes 11 is 1⅜ inches. The dough pieces formed under these conditions are substantiall circular, measuring approximately 1⅛ inches long and 1¼ inch wide, and being about ¾ inch in height. These dough pieces bake out to be approximately two inches in diameter and about ⅜ inch thick at the center. The round central orifice of the die 20 enables the use of an inner core material containing large discrete particles, such as chocolate chips, to be extruded.

In the dough pieces 51 formed by the preferred embodiments of the present invention, the inner material is totally enveloped by a continuous layer of the outer material which is of substantially uniform thickness throughout.

In the description and the claims, the term "extrudate" refers to extruded material, and the term "rope" is intended to describe the continuous unified nature of the extrudate in the longitudinal direction, and not its cross sectional configuration. The terms "edible material" and "edible products" include materials and products such as flour doughs and other materials resembling flour doughs.

The outer dough which forms the tube 25 and the enveloping layer of the dough pieces 51, is preferably a soft cookie dough such as that used in a wire cut or drop cookie. The invention contemplates however, the use of other doughs which are susceptible to extrusion with the type of equipment shown.

The inner or core material may be a dissimilar dough or any of a wide variety of other filling materials.

It will be seen from the foregoing that the present invention provides an improved method and apparatus for producing, in a fast and efficient manner and without the generation of significant scrap, baked goods and dough pieces having a center of one material enveloped by an outer layer of another material by cutting continuously extruded concentric extrudate ropes being transported on horizontal conveyors.

What is claimed is:

1. A method for forming individual edible products from an edible material without generating waste, comprising the steps of:
  extruding a rope of the edible material onto a horizontal conveyor;
  engaging said rope with a pinching means having first and second counter-rotating wheel means disposed on either side of said rope, each said wheel means having a lower surface parallel with and spaced above said conveyor means and carrying pin means adjacent the perimeter thereof and extending downwardly toward said conveyor means, synchronized such that said pin means simultaneously engage opposite sides of said rope, whereby said pinching means form spaced sections of reduced width; and
  separating said extrudate rope at said reduced-width sections.

2. The method recited in claim 1 wherein the predetermined intervals approximate the width of the extrudate rope whereby the edible products formed are substantially round.

3. The method recited in claim 2 wherein the extrudate rope is composed of an inner core and an outer tube of dissimilar materials, and the rope is separated by a blunt edged blade to displace the inner core material and seal the outer tube to itself whereby edible products are formed in which the core material is totally enveloped by the outer tube material.

4. Apparatus for forming individual edible products from an edible material without generating waste comprising means for extruding a rope of the edible material, conveyor means for transporting the extrudate rope, means for pinching the rope at predetermined intervals to form spaced sections of reduced width, including first and second counter-rotating wheel means disposed above said conveyor means on either side of said extrudate rope conveyed by said conveyor means, each of said wheel means having a lower surface facing said conveyor means, said lower surface having a downwardly-extending pin means adjacent the perimeter of said wheel means for engaging said extrudate rope on said conveyor means, said wheel means being synchronized so that said pin means engage opposite sides of said extrudate rope at the same time, and means for separating the rope at said reduced width sections into individual edible products.

5. The apparatus recited in claim 4, wherein said pins are spaced such that the rope is pinched at intervals approximating the width of the rope whereby the edible products formed are substantially round.

6. The apparatus recited in claim 5 wherein the rope is composed of an inner core and an outer tube of dissimilar materials, and wherein said means for separating the rope includes a blunt edged blade which displaces the inner core material and seals the outer tube to itself whereby the outer tube material totally envelopes the core material.

7. The apparatus recited in claim 4 wherein said means for separating comprises first and second blunt edged blade means curved in opposite directions in plan view and having their convex surfaces mutually abutting at a central point, said first and second blade means being slidably disposed above said conveyor means so as to move toward said conveyor means at selected times.

8. The apparatus recited in claim 7 further comprising flexible web means disposed between said means for separating and said conveyor means, said web means preventing said edible material from adhering to said first and second blade means.

9. The apparatus recited in claim 4 wherein said first and second wheel means include a plurality of pin means evenly spaced adjacent the perimeter of said wheel means.

* * * * *